March 13, 1934.　　F. A. FAHRENWALD　　1,950,790
GUNSIGHT RETICULE ADJUSTMENT MEANS
Filed Sept. 22, 1931　　2 Sheets-Sheet 1
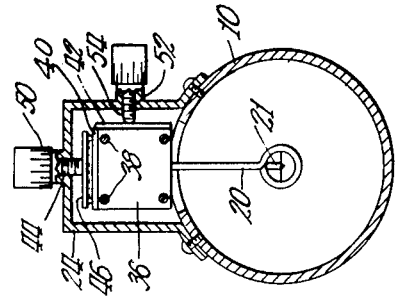
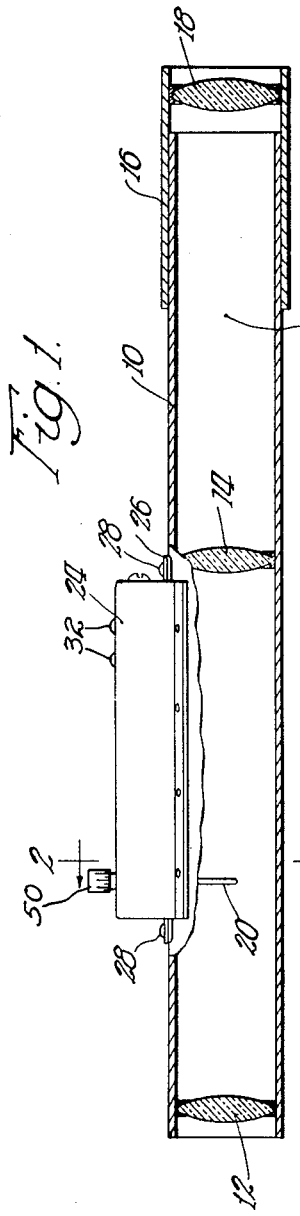
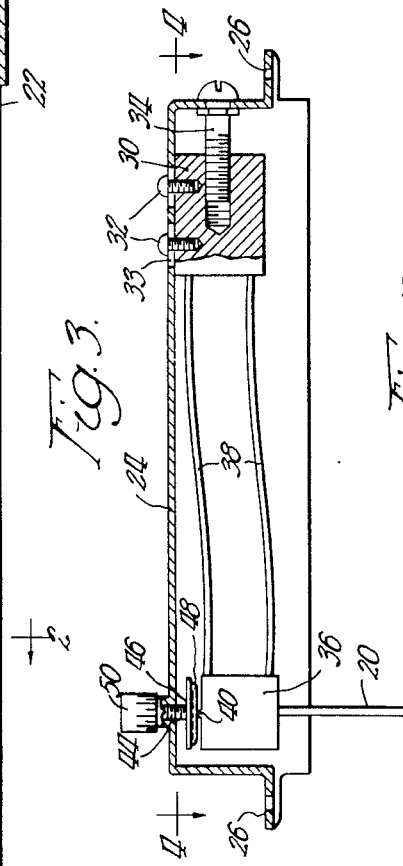
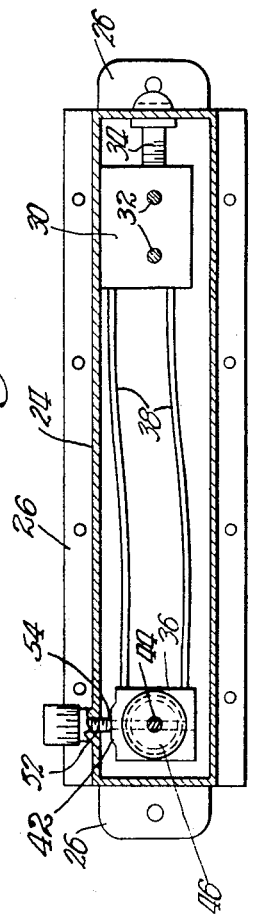
INVENTOR
FRANK A. FAHRENWALD
By Freeman and Sweet
ATTORNEYS

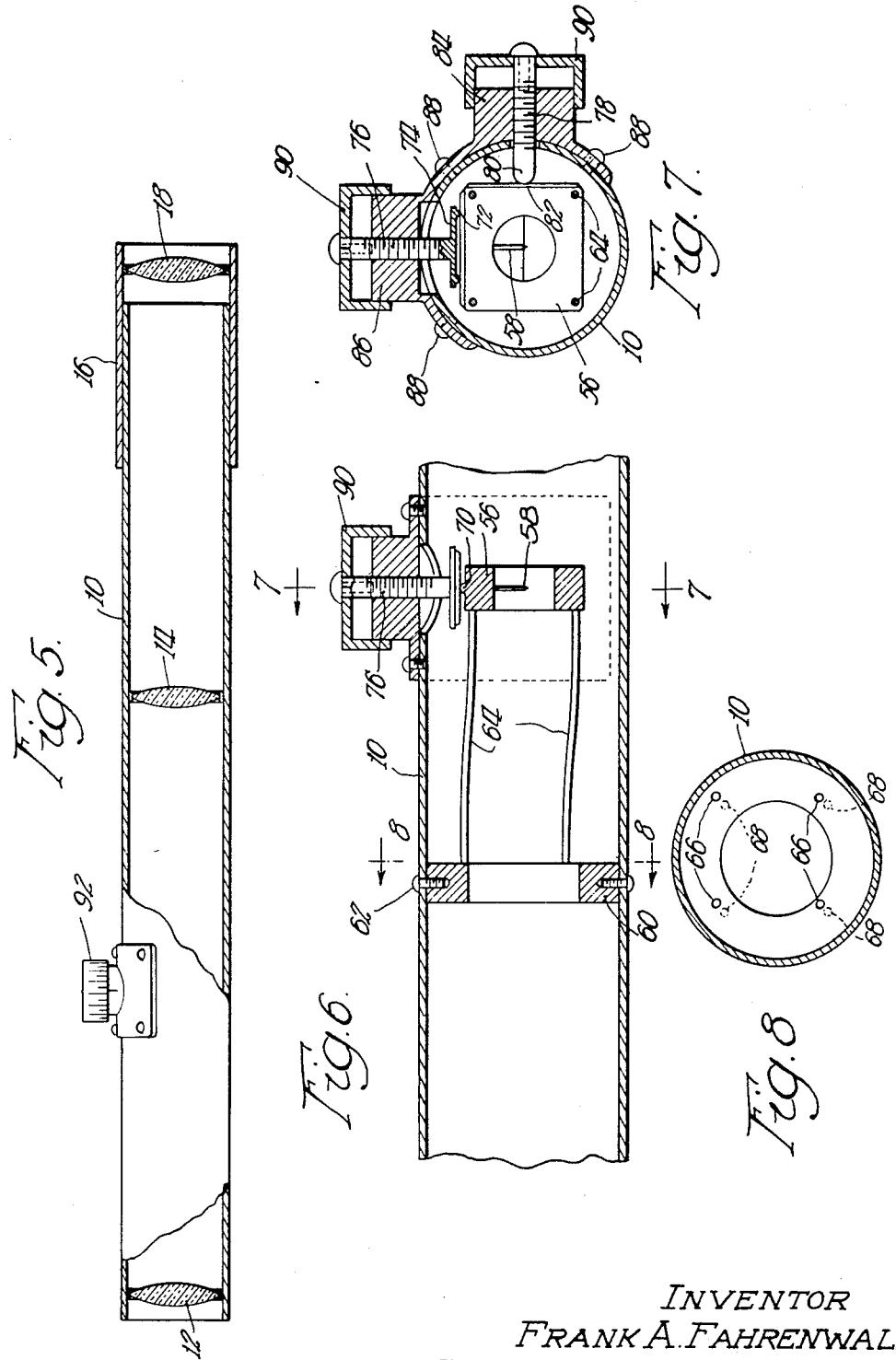

Patented Mar. 13, 1934

1,950,790

UNITED STATES PATENT OFFICE 1,950,790

GUNSIGHT RETICULE ADJUSTMENT MEANS

Frank A. Fahrenwald, Chicago, Ill.

Application September 22, 1931, Serial No. 564,326

8 Claims. (Cl. 33—50)

My invention relates to precise adjustment of a movable member, and includes among its objects and advantages the provision of adjustment means particularly suitable for adjusting such a movable member as the sighting member or reticule of a telescopic gun-sight.

In the accompanying drawings:

Fig. 1 is a side elevation of an embodiment of the invention attached to a telescopic gun-sight with the telescope shown diagrammatically in section.

Fig. 2 is a section on line 2—2 of Fig. 1.

Fig. 3 is a section on line 3—3 of Fig. 2.

Fig. 4 is a section on line 4—4 of Fig. 3.

Fig. 5 is a side elevation partly in section of a gun-sight with the reticule support inside the tube.

Fig. 6 is an enlarged vertical section of part of Fig. 5.

Fig. 7 is a section on line 7—7 of Fig. 6, and

Fig. 8 is a section on line 8—8 of Fig. 6.

In the embodiment selected to illustrate the invention, the telescope comprises the tube or body 10 supporting the objective 12 and the inverting lens assembly 14, and the eye piece 16 carrying the lens 18 and adjustable axially for focusing. In certain telescopes of this type, the objective 12 projects the image of the target in the plane of the cross hairs of the reticule or other sighting member unit, comprising the frame 20, the cross hairs 21, and the block 36. The inverted image of the target and the cross hairs of the reticule are then brought together into a re-inverted image at 22 by means of the lens 14, and this image is viewed by the user through the lens 18.

By providing the reticule unit with universal adjustment in the focal plane of the objective 12, it is possible to fasten or otherwise assemble the tube 10 as a rigid part of the rifle or other firearm without adjusting means other than for removal, and to make all the necessary final sighting-in adjustments by adjustment of the reticule inside the telescope tube.

Referring now to the support for the reticule, I have indicated a housing 24 having flanges 26 for fastening it on the tube 10 as by means of fastening screws 28. At the rear end of the housing 24 I mount a fixed support or body connection 30 by means of clamping screws 32. The screws 32 pass through slots 33 in the top of the casing, so that the support 30 may be given a preliminary adjustment by loosening the screws 32 and rotating the adjustment screw 34 to move the support 30 parallel to the axis of the telescope, and bring the member 20 precisely into the focal plane of the objective 12.

The member 20 constitutes a rigid projection from the block 36 positioned near the front end of the housing 24. Between the block 36 and the support 30 I provide four parallel spacing elements 38 of equal length. These elements are integrally united at their ends with the block 36 and the support 30. The parts are initially assembled so that in undistorted condition the spacing elements 38 would support the block 36 in a position materially higher and further to the right than that shown in Fig. 2. Thus, in the undistorted position of the spacing elements 38 the block 36 will lie against the head 46 of the adjustment screw 44 in its uppermost adjusted position, and will lie practically in contact with the left side wall of the casing viewed as in Fig. 4. This initial assembly is easily secured by drilling holes for the spacing elements 38 in axial alignment with the sides of the support 30 and block 36, and then setting the support 30 in actual contact with the top and with the right side walls of the casing, after which the adjustment screws may be advanced to bring the reticule over and down into the position of Fig. 2.

On the top face of the block 36 I form a slight transverse rounded ridge 40, and on the left side of the block I form a flat track at 42. Vertical adjustment is by means of an abutment in the form of an adjustment screw 44 threaded through the top wall of the housing and provided with an enlarged face 46 having an annular peripheral rib 48 engaging the ridge 40 on opposite sides of the vertical central plane. A calibrated head 50 on the outer end of the adjustment screw 44 provides for quick and accurate manual adjustment. Horizontal adjustment is by an adjustment screw 52 with a rounded face at 54 riding on the track 42.

When the adjustable supporting means of the invention is part of a gun-sight, I assemble the parts in such a way that in the lowest working position of adjustment for point blank firing, the elements 38 slope downwardly and forwardly. When this condition obtains, adjustment for firing at longer ranges is by moving the member 20 upwardly and forwardly, the forward movement being a very small fraction of the upward movement. In this way the parts may readily be so proportioned that the forward movement will increase the precision with which the sighting member 20 is kept in the focal plane of the objective 12. It will be obvious that the objective 12 will focus remote objects at a point a trifle closer to itself than in the case of near objects, so that in firing on remote objects with the sighting member 20 raised from the position of Fig. 2, the sighting member should be a trifle closer to the objective 12.

In Fig. 6 the reticule comprises only the single frame block 56 in which the cross hairs 58 are directly mounted. The support 60 is rigidly fastened in the tube 10 by means of screws 62. The spacers 64 are rigidly fastened into the four corners of the reticule. In fastening the other ends of the spacers into the ring 60, the holes are drilled offset both above and to the right as viewed in Fig. 8, where the positions of the actual holes are indicated at 66, and the dotted lines at 68 show the axial projections of the holes for the reticule ends of the spacers in adjusted position of the reticule. The ring 60 is located about midway between the reticule and the objective 12.

The reticule block 56 carries a transverse rounded ridge 70 having two point contact with the lip 72 on the face 74 of the adjustment screw 76. Horizontal adjustment screw 78 is a duplicate of adjustment screw 76 except that it has a rounded face 80 riding on the track 82. The guide blocks 84 and 86 through which the adjustment screws 78 and 76 are threaded are formed in a single die casting fastened on the tube by fastening screws 88, and are covered by duplicate covers 90 calibrated as at 92 to facilitate adjustment.

In all positions of adjustment the spacing elements 38 or 64 exert a force upward and to the right as seen in Figures 2 and 7. In every position within the limits of adjustment, the point of contact between the rounded pin end 54 and the track 42 is on one side of this line of force, and the point of contact between the remote portion of the rib 48 and the ridge 40 is on the other side of the line of force, so that there is never any tendency to displace the reticule by rotation about its own longitudinal axis.

In previous telescope gun-sights, so far as I am aware, one or both of the adjustments for elevation and windage has been external to the telescope tube, or both of them have been by adjustment members such as screws operating to move the adjusted member in both directions, with gripping means having a sliding action to guide the movement. Such adjustments involve lost motion, so that precise adjustment is extremely difficult and a matter of repeated guesses. This is particularly true because to avoid accidental displacement by vibration at the time of firing, it is necessary to have a fairly heavy frictional resistance offered by the guide means, which tends to make the screw threads wear and thus further increase the inaccuracy. Furthermore, such guiding surfaces with frictional sliding contact are not always proof against slight accidental displacement of the parts within the limits of the backlash of the screws by the severe shock of firing, and, of course, when such displacements occur, the best efforts of the marksman are rendered substantially useless.

Without further elaboration, the foregoing will so fully explain my invention that others may, by applying knowledge current at the time of application, readily adapt the same for use under various conditions of service. For instance, with a prism type telescope the first image and the reticule will be between the prisms and the eye piece.

I claim:

1. In a sighting telescope for firearms having a body, the combination of a sighting reticule, elements to support and axially position said reticule, said supporting elements being assembled to said telescope body and engaging the same axially remote from said reticule, means for displacing said reticule to effect windage and elevation adjustments, at least one of said supporting elements being positioned outside a plane defined by two other supporting elements, thereby maintaining substantial parallelism between the plane of said reticule and the focal plane of said telescope at all positions of windage or elevation adjustment, said supporting elements being flexible axially extending parallel spacing members each having one end rigidly fastened to said reticule and the axially remote end rigidly fastened to said body.

2. In a sighting telescope for firearms having a body, the combination of a sighting reticule, at least three elements to support and axially position said reticule, said supporting elements being assembled to said telescope body and engaging the same axiallly remote from said reticule, adjustable abutment means for displacing said reticule to effect windage and elevation adjustments, at least one of said supporting elements being positioned outside a plane defined by two other supporting elements, thereby maintaining substantial parallelism between the plane of said reticule and the focal plane of said telescope at all positions of windage or elevation adjustment, said elements themselves being resilient to press said reticule against said abutment means and at the same time permit adjustment.

3. In a sighting telescope for firearms having a body, a rigid reticule, a rigid support axially spaced from said reticule, and members rigidly connected to said reticule and said support, said members supporting said reticule and by their own resilience permitting movement of the reticule as by a parallel arm linkage.

4. In a sighting telescope for firearms having a body, a rigid reticule, a rigid support axially spaced from said reticule, and members rigidly connected to said reticule and said support, said members supporting said reticule and by their own resilience permitting movement of the reticule as by a parallel arm linkage, and windage and elevation adjustment means operating horizontally and vertically by abutment and in opposition to the resilience of said flexed members.

5. A gun-sight telescope having a bore, an objective at one end thereof, a reticule at the focus of said objective, a supporting ring fastened in said bore axially remote from said reticule, members parallel to each other and fastened at their opposite ends to said reticule and to said supporting ring to support said reticule, mechanical adjustment means for pushing vertically against said reticule, mechanical adjustment means for pushing horizontally against said reticule, said members being resilient means and tending to hold said reticule against both adjustment means.

6. In a sighting telescope for firearms, a hollow body, a sighting reticule inside said body, a reticule-supporting structure rigidly connected with said reticule and extending axially of the body, a body connection axially remote from said reticule rigidly connecting the remote end of said supporting structure to the body, said supporting structure being flexible substantially equal in any direction, and two adjustment means each accessible from outside said body and operatively engaging said reticule, one adjustment means displacing said reticule in a vertical plane undisturbed by horizontal displacement of said reticule, and the other adjustment means displacing said reticule in a horizontal plane undisturbed by vertical displacement of said reticule, said supporting structure comprising a plurality of substantially parallel flexible cantilevers each rigidly connected at one end to said reticule and at the other end to said body connection.

7. In a sighting telescope for firearms, a hollow body, a sighting reticule inside said body, a reticule-supporting structure rigidly connected with said reticule and extending axially of the body, a body connection axially remote from said reticule rigidly connecting the remote end of said supporting structure to the body, said supporting structure being flexible substantially equal in any direction, and two adjustment means each accessible from outside said body and operatively engaging said reticule, one adjustment means displacing said reticule in a vertical plane undisturbed by horizontal displacement of said reticule, and the other adjustment means displacing said reticule in a horizontal plane undisturbed by vertical displacement of said reticule, said supporting structure comprising not less than three substantially parallel flexible cantilevers lying in more than one plane and each rigidly connected at one end to said body connection, said body connection being an annular ring fixedly fastened inside said body.

8. In a sighting telescope for firearms, a hollow body, a sighting reticule inside said body, a reticule-supporting structure rigidly connected with said reticule and extending axially of the body, a body connection axially remote from said reticule rigidly connecting the remote end of said supporting structure to the body, said supporting structure being flexible substantially equal in any direction and when flexed exerting a force along the line extending back toward the undistorted position of the parts, and two adjustment means each accessible from outside said body and operatively engaging said reticule, one adjustment means displacing said reticule in a vertical plane undisturbed by horizontal displacement of said reticule, and the other adjustment means displacing said reticule in a horizontal plane undisturbed by vertical displacement of said reticule, said supporting structure comprising a plurality of substantially parallel flexible cantilevers each rigidly connected at one end to said reticule and at the other end to said body connection, said adjustment means in all positions of adjustment engaging said reticule on both sides of the line of force back toward the undistorted position of the parts, to prevent any torsional movement of the reticule about a longitudinal axis.

FRANK A. FAHRENWALD.